United States Patent [19]
Arends et al.

[11] Patent Number: 4,478,619
[45] Date of Patent: Oct. 23, 1984

[54] COMPRESSED AIR FILTERING APPARATUS

[76] Inventors: Andrew G. Arends, 202 E. State St., Ontario, Calif. 91761; Gary W. Arends, 9999 Foothill - Space 163, Rancho Cucamonga, Calif. 91701

[21] Appl. No.: 490,335

[22] Filed: May 2, 1983

[51] Int. Cl.³ .................. B01D 50/00; B01D 27/02
[52] U.S. Cl. .................................. 55/316; 55/322; 55/323; 210/282
[58] Field of Search .............. 55/316, 318, 321–323, 55/331, 332, 465, 269, 387; 210/282

[56] References Cited

U.S. PATENT DOCUMENTS

| | | | |
|---|---|---|---|
| 941,675 | 11/1909 | Green | 55/323 |
| 973,775 | 10/1910 | Goodrich | 55/332 X |
| 2,096,851 | 6/1934 | Fricke | 55/323 X |
| 2,772,750 | 12/1956 | Bystricky | 55/465 X |
| 2,953,215 | 9/1960 | Vaisala | 55/387 X |
| 3,175,342 | 3/1965 | Balogh | 210/282 X |
| 3,308,957 | 3/1967 | Klein | 210/282 X |
| 3,396,515 | 8/1968 | Wright | 55/323 X |
| 3,791,105 | 2/1974 | Rhodes | 55/322 X |
| 4,242,111 | 12/1980 | Arends et al. | 55/269 |

Primary Examiner—Charles Hart

[57] ABSTRACT

Incoming air passes through one or more orifices in an expansion head forming small jets which impinge upon a downwardly facing cylindrical wall for moving water droplets and the like into a sump. A curved shield located above the cylindrical wall serves to move the incoming air upwardly in a relatively uniform billowing mass. A filter cartridge includes, in the order described from the lowermost to the topmost, at least three individual cells. The first cell contains cotton waste for absorbing water, oil, particulate matter and the like. The second cell contains a material for capturing such things as oil aerosols, for example. The uppermost cell, again, contains cotton waste for removing particulate matter, such as dust from the molecular sieves, for example, and any residual moisture. The cells are spaced from one another by spring-loaded means to maintain the separation. The spaced relation of the cells prevents channeling of pressurized air through the cells.

4 Claims, 8 Drawing Figures

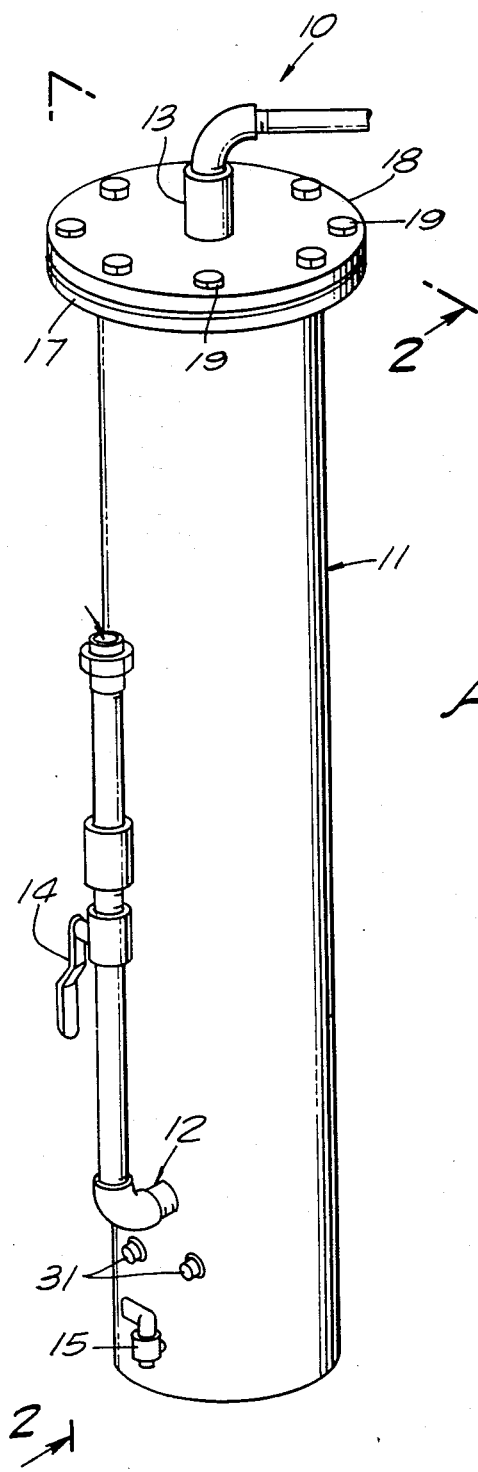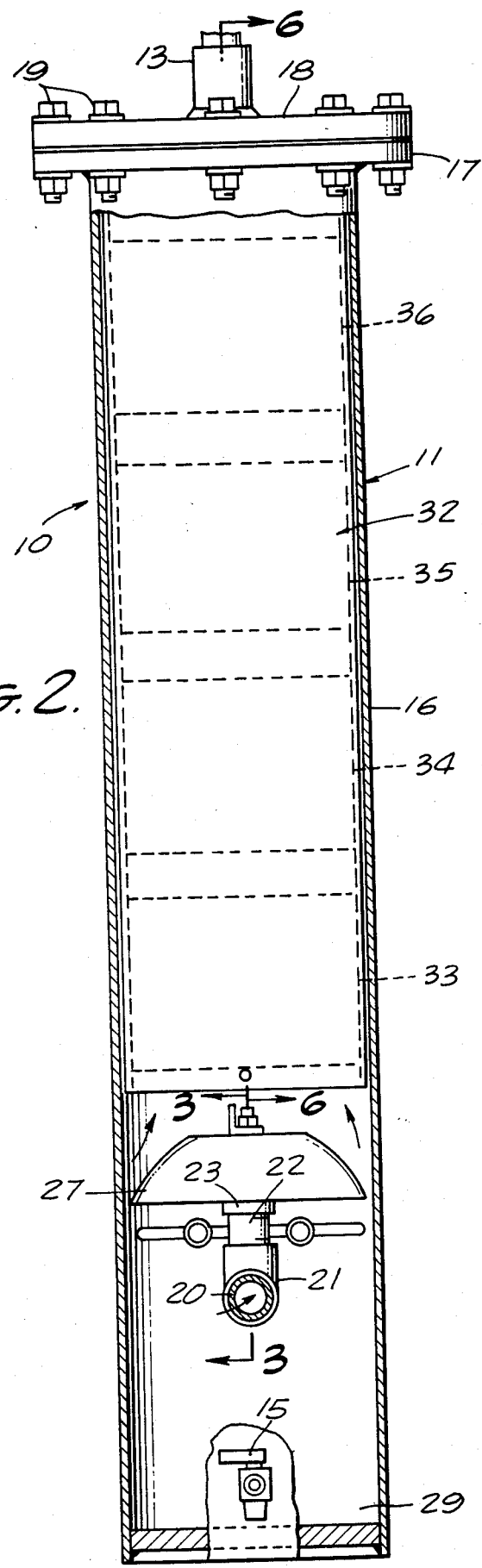

COMPRESSED AIR FILTERING APPARATUS

The present invention relates generally to compressed air filtering apparatus, and more particularly to such apparatus for use in industrial or manufacturing situations where it is necessary or advisable to remove water, oil and particulate matter from air prior to its being utilized in an industrial or manufacturing process.

BACKGROUND

Pressurized dry air which is relatively free from particulate matter and oil is required for many industrial uses. Moreover, in an industrial context the source of air to be cleaned and dried frequently exists at a prohibitively high temperature for efficient use of many desiccants. Still further, there are many installations where the source air contains a high percentage of water so that if only absorbent media are used for drying the air, this necessitates frequent replacement of the water saturated absorbent media to maintain filtering efficiency which is both expensive and time consuming.

SUMMARY OF THE INVENTION

As a housing for the described filtering apparatus there is provided a hollow cylindrical enclosure adapted generally for vertical mounting. At the housing lower end a suitable fitting is located via which air to be filtered and dried enters. The incoming air is passed upwardly through one or more orifices in an expansion head forming small jets which impinge upon a downwardly facing shield for removing water droplets and the like from the air and dropping them into a sump in the bottom of the housing. A further curved shield larger than the first shield and located above it, serves to move the incoming air upwardly in a relatively uniform billowing mass.

A filter cartridge is releasably located within the chamber above the expansion head and shield, and spaced therefrom. The filter cartridge includes, in the order described from the lowermost to the topmost, at least three individual filtering and drying cells. The first cell includes cotton waste which is primarily for catching droplets of water and absorbing them into the waste to remove the water. The second cell includes a material such as so-called molecular sieves for capturing such things as oil aerosols and the like. The third cell, which is the uppermost one, is again made of cotton waste for removing particulate matter, such as dust from the molecular sieves, for example, and any residual moisture. Each of the cells are separated from one another by spring-loaded means to maintain the separation. The spaced relation of the cells is important in that the spacing provides pressure relief regions preventing breakthroughs in the cell walls, at which points the air would tend to pass rather than moving through the cell uniformly across its full width. This undesirable phenomenon is known as "channeling" and sharply reduces overall filtering and drying efficiency. Also, the cell spaced relationship eliminates "wicking" that would occur on direct contacting of the cells and which is detrimental to filtering and drying.

DESCRIPTION OF THE DRAWING

FIG. 1 is a perspective view of the air filtering apparatus of this invention.

FIG. 2 is a longitudinal, sectional, partially fragmentary view taken through the expansion head along the line 2—2 of FIG. 1.

DESCRIPTION OF PREFERRED EMBODIMENTS

Figure 3:
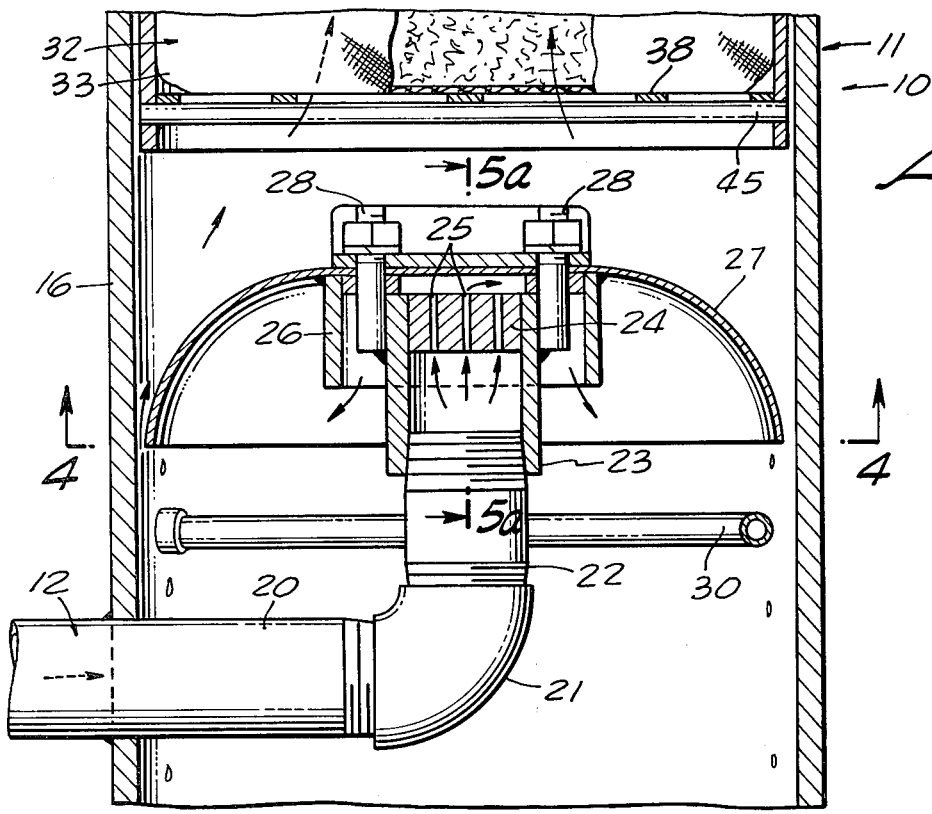
FIG. 3 is a sectional view taken along the line 3—3 of FIG. 2.
Figure 4:
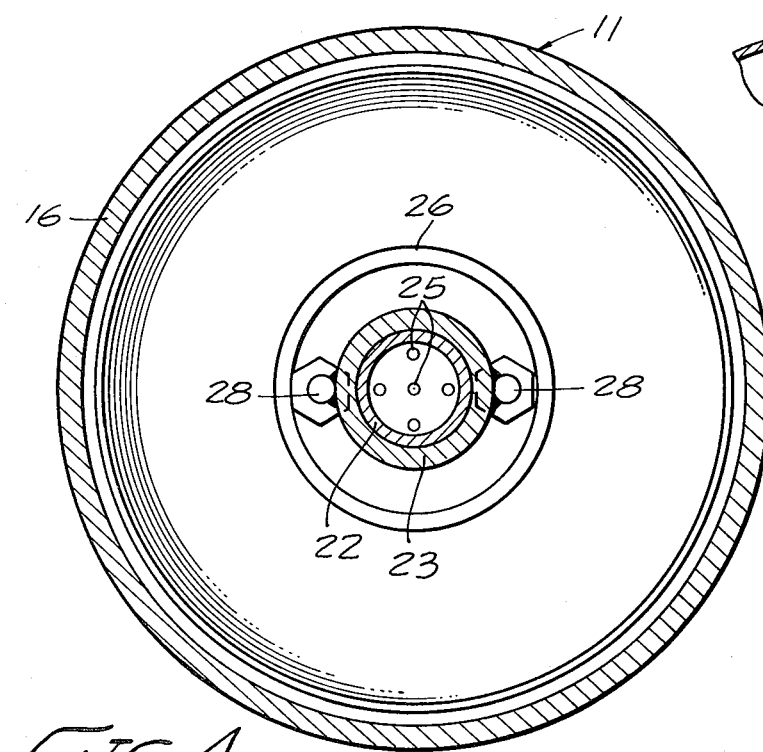
FIG. 4 is a sectional, top plan view taken along the line 4—4 of FIG. 3.

With reference now to the drawing and particularly FIG. 1, the air drying apparatus of this invention is indicated generally as at 10 which, in its externally appearing form, is seen to include a generally cylindrical housing 11 adapted for mounting with its cylindrical axis oriented generally vertically and having an air inlet fitting 12 via which pressurized air containing moisture and other contaminants are admitted and a fitting 13 at the upper end of the housing from which dried and cleaned air is removed. An on-off valve 14 is typically added to the air inlet line for closing off the system during repair or changing the filter cartridge to be described. Also, a petcock 15 located in the lower housing sidewall enables removal of water, oil and other sludge material as will be described. Although the apparatus to be described herein would be beneficial for filtering gases of various kinds, the described apparatus is particularly adapted for removing moisture, oil and particulate matter from air existing at a pressure higher than normal ambient air pressure.

As can be seen best in FIG. 2, the housing 11 is seen to comprise a hollow, cylindrical wall 16 which is imperforate except for the openings to accommodate the fittings 12 and 13, as well as the petcock 15. The upper end of the housing wall has an outwardly extending flange or rim 17 onto which a cover plate 18 is releasably secured by nut and bolt means 19. The dried air outlet fitting 13 is located at substantially the center of the cover plate.

Figure 5A:
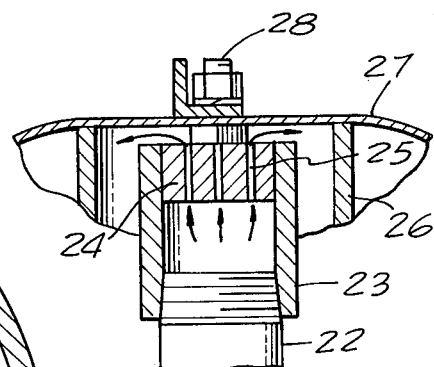
FIG. 5a is a further sectional view through the expansion head taken along the line 5—5 of FIG. 3.

Turning to FIGS. 3 and 5a, a pipe 20 connected to the fitting 12 extends generally horizontally within the housing to a point substantially on the housing longitudinal cylindrical axis where it is interconnected with an elbow 21 that is threaded into a pipe section 22 extending upwardly along the same housing axis. A further length of pipe 23 threaded onto pipe section 22 is closed off at its uppermost end by a plug 24 through which a plurality of orifices 25 pass. A cylindrical wall 26 is received about the lead plug end of the pipe section 22 and has its upper end bonded to the inner surface of an enlarged shield 27 having sidewalls extending outwardly of the wall 26 and curving downwardly. A pair of threaded members 28 have their end portions affixed to the pipe 23 and extend through openings in the shield 27 for securing the two together. The spacing from the upper end of the pipe 23 (which is coextensive with the outermost surface of the plug 24) and the inner surface of the shield 27 is in the order of 0.25 inches.

With respect to operation of the apparatus described to this point, incoming pressurized air containing moisture, oil, sludge and the like, on passing through the orifice 25 experiences a rapid expansion which cools the air and aids in condensing out moisture contained in the air. Also, the pressurized air on being emitted from the orifices impinges upon the inner surfaces of the wall 26 and shield 27 and water falls off in large droplets for receipt in a sump chamber 29 located in the lower part of the housing (FIG. 2). Also, of course, large sized particulate matter, and other heavy materials such as oil and sludge in the air will be deposited in the sump in the same manner.

A hollow tube 30 extends substantially completely around the pipe section 22 just under the lower edges of the shield 27. The tube ends extend through the housing wall 16 terminating outside the housing in fittings 31 (FIG. 1) via which pressurized cooling water may be passed through the tube. Cooling of the tube 30 in this way cools the apparatus and air immediately adjacent the plug openings 25 which promotes condensation of the moisture in the air thereby enhancing the air drying efficiency.

The shield 27 serves to distribute the pressurized air emitted from the plug openings uniformly outwardly toward the housing wall 16 along with any residual moisture and droplets that are light enough to billow upwardly. The importance of this is to prevent the formation of relatively small streams or channels of pressurized air which might tend to break down the filtering and drying media to be described where these channels of pressurized air contact the media and in that way produce preferred low-resistance paths through the media which sharply reduces the overall filtering and drying efficiency.

The petcock is located in the housing sidewall closely adjacent the lower end or bottom wall when opened with the inlet air pressure on allows periodic drainage of the sludge, oil and water accumulated in sump chamber 29.

Figure 6:
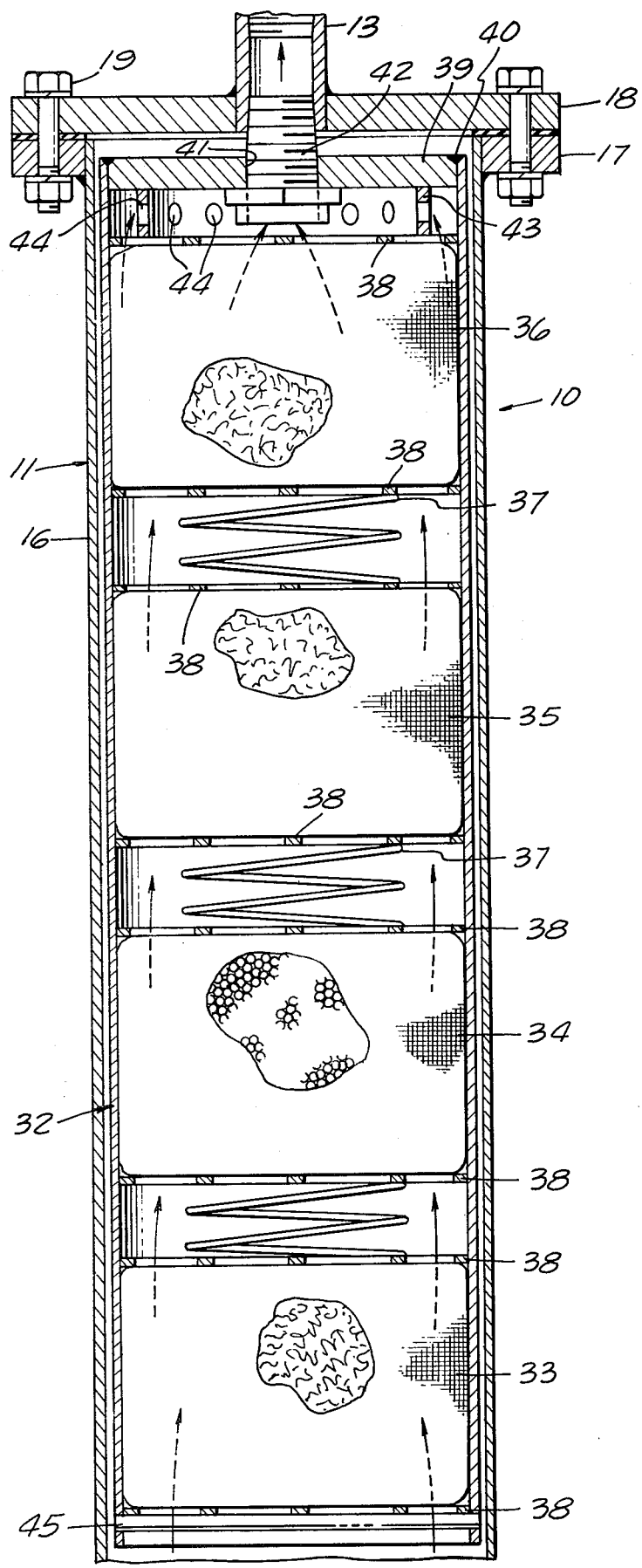
FIG. 6 is a side elevational, sectional view through the filter cartridge taken along the line 6—6 of FIG. 2.

Turning now particularly to FIG. 6, there is shown an elongated cylindrical filter cartridge 32 located with the lower end thereof spaced upwardly from the top of the shield 27. More particularly, the filter cartridge consists generally of a hollow, cylindrical member, the side walls of which are imperforate and having its upper end connected to the cover plate 18 with the remainder extending downwardly within the housing cavity to terminate just above the shield 27. The interior of the filter cartridge is in direct communication with the fitting 13 such that dried and filtered air can be directed outwardly of the housing for use as desired.

A plurality of filter and drying cells 33 through 36 are located within the cartridge cylinder, each being so dimensioned and of such geometry as to be received with its walls closely fitting against the cartridge inner wall surface. Additionally, the filter cells are held separated from one another by coil springs 37, the ends of which springs abut and act against mesh plates 38 which lie against the facing surfaces of each cell.

The upper end of the cartridge cylindrical wall is closed off by a circular plate 39 having its edges hermetically sealed to the wall as at 40. A central opening 41 in plate 39 includes a threaded pipe section 42 which is threaded into similarly threaded fitting 13. An annular spacer 43 having a plurality of openings 44 therein engages the inner surface of cartridge top plate 38 and the mesh plate at the top of cell 36. A coil spring 37 contacts the two mesh plates on the lower surface of cell 36, and the top surface of cell 35, respectively. Similarly, cells 35 and 34 are held apart, as are cells 33 and 34. The entire set of cells are retained in the cartridge housing by a transversely extending pin 45 located below the lowermost mesh plate of cell 33.

As already noted, the purpose of separating the filter cells is eliminating "wicking" between adjacent cells and to prevent "channeling" of air passing therethrough with its destructive effect upon filtering efficiency. In explanation of the latter, air leaving one cell expands into the space provided before entering the next consecutive cell and therefore it will not be confined into one or more highly pressurized air streams which could damage the next adjacent cell and produce preferential paths or channels therethrough.

Still referring to FIG. 6, the filter cells 33-36 are each seen to consist of an outer fabric bag having a relatively close mesh through which pressurized air can pass. In the case of the cells 33, 35 and 36, the bag includes a quantity of cotton waste which is ideal for absorption of water and filtering particulate matter. A drawstring may be used to close up the bag opening after filling with absorbent medium.

The cell 34, which is second in the filtration line, instead of being filled with cotton waste includes a quantity of a material which will absorb oil aerosols produced by the pumping equipment for pressurizing the air. Excellent materials for removing such aerosols are so-called molecular sieves which are commercially available from a wide variety of sources.

It is to be noted that several of the cells, namely cells 33, 35 and 36, include cotton waste as the absorbing medium, only the one cell 34 having an absorbing medium specificly for oil aerosols is required. The oil aerosol filtering agent should be located above a cotton waste cell which will remove a substantial amount of moisture that would otherwise reduce the ability of the absorbing medium of cell 34 to capture oil aerosols. The cotton waste cells 35, 36 serve both to remove any remaining moisture as well as powder or fine particulate matter released by the absorbing medium of cell 34 (e.g., molecular sieves).

Figure 7:
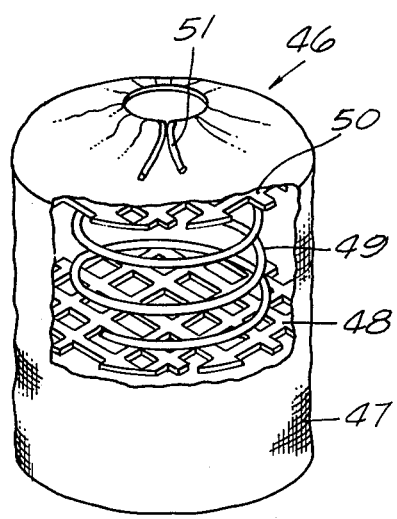
FIG. 7 is a perspective, exploded view of a filter cell and end plate utilized in the filtering apparatus.

FIG. 7 depicts an alternate form of cell construction 46 which is especially advantageous when using cotton waste as the absorbing medium. More particularly, a fine mesh bag or sack 47 includes a quantity of cotton waste as in the first described embodiment. A mesh plate 48 (identical to mesh plate 38) is received in the bag and abuts against the waste. A spring 49 (identical to spring 37) and another mesh plate 50 are placed over plate 48 and the sack is closed, as by a drawstring 51, for example. In operation, flexing of the spring 49 within the bag does not cause the bag exterior about the cotton waste to wrinkle as can happen in the first described form of cell. Wrinkling can also produce channeling.

When the filter cartridge has become saturated with contaminants, it is only necessary to turn off valve 14, remove the cover plate 18, lift out the saturated cartridge and replace it. The sump chamber 29 should be drained daily, or more frequently, as experience at any particular place of use indicates.

Figure 5B:
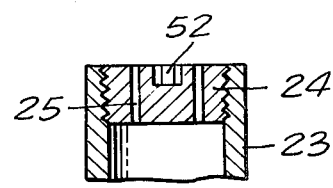
FIG. 5b shows an alternate form of the expansion head.

FIG. 5b shows an alternate form of the expansion head. Specifically, the plug is threaded into the pipe 23 with rotation of the plug being accomplished by inserting a properly formed tool (e.g., Allen wrench) into the shallow opening 52 in the plug top surface.

We claim:

1. Apparatus for removing water, liquids and particulate matter from pressurized air, comprising, in combination:
   a housing including an internal chamber, an air inlet fitting, an air outlet fitting and a liquid drainage fitting;
   means interconnected with the inlet fitting for receiving the pressurized air and passing the same through one or more orifices into the housing chamber, said means including a pipe section with a plug therein and said plug having at least one orifice;
   shield means positioned within the chamber for intercepting air from the orifices and directing it downwardly in said housing chamber, said means including a cylindrical wall having one end open within which the pipe section is received and the other end pipe section of said cylindrical wall being affixed to a shield wall sloping downwardly in the housing chamber; and
   a filter cartridge located between the shield means and the air outlet fitting and spaced from the shield means including a plurality of spaced apart cells of an absorbing medium.

2. Apparatus as in claim 1, in which a first cell includes a medium for absorbing oil aerosols, and cells on each side of said first cell include cotton waste as the absorbing medium.

3. In apparatus for removing water, liquids and particulate matter from pressurized air, a housing with an internal chamber, an air inlet fitting, and air outlet fitting and a liquid drainage fitting; means interconnected with the inlet fitting for receiving the pressurized air and passing the same through one or more orifices into the housing internal chamber; shield means positioned within the chamber for intercepting air from the orifices and directing it downwardly in said housing chamber, the improvement comprising:
   a filter cartridge located between the shield means and the air outlet fitting including;
   a hollow cylindrical wall closed at one end;
   a plurality of cells arranged within the cylindrical wall in a line along the same with the peripheral surface of the cells in substantially continuous contacting relation with the cylindrical wall;
   mesh plate means on facing surfaces of the cells and the innermost surface of the cell immediately opposite the cylindrical wall closed end;
   coil spring means interposed between and contacting the mesh plate means on said cells;
   an annular spacer contacting the cylindrical wall closed end and facing mesh plate, and
   means holding the cell immediately adjacent the cylindrical wall open end within the cylindrical wall.

4. Apparatus as in claim 3, in which certain of said cells each include an outer fabric baglike enclosure, a quantity of absorbing medium within the enclosure, first mesh plate means abutting against the abutting against the inner surface of the baglike enclosure and facing the first mesh plate means, and spring means located between the first and second mesh plates resiliently holding said plates apart.

* * * * *